Figure 6:
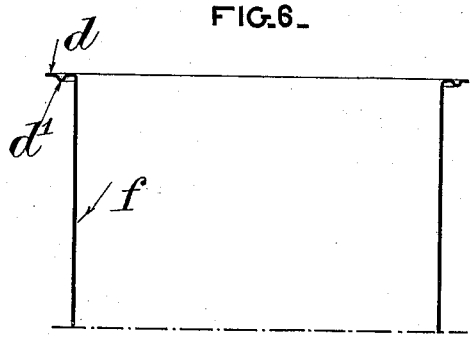

(No Model.) 2 Sheets—Sheet 1.
I. BLOCH.
HERMETIC FASTENING FOR PRESERVE OR OTHER TINS.
No. 601,787. Patented Apr. 5, 1898.
FIG.1.
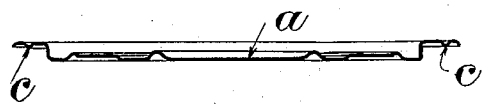
FIG.2.
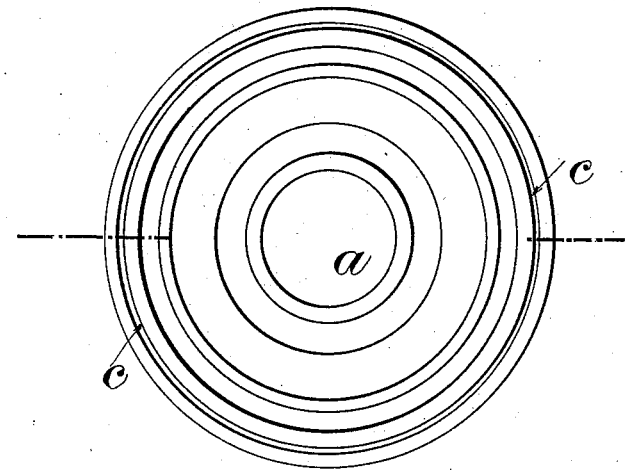
FIG.3. FIG.4.
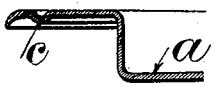 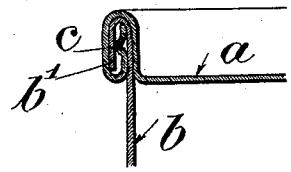
FIG.5.
Witnesses:
C. Holloway
Pennington Halsted
Inventor:
Isidore Bloch
By J.E.M. Bowen
Attorney
THE NORRIS PETERS CO., PHOTO-LITHO., WASHINGTON, D. C.

(No Model.) 2 Sheets—Sheet 2.

I. BLOCH.
HERMETIC FASTENING FOR PRESERVE OR OTHER TINS.

No. 601,787. Patented Apr. 5, 1898.

Witnesses:
C. Holloway
Pennington Halsted

Inventor:
Isidore Bloch
By J E M Bowen
Attorney

UNITED STATES PATENT OFFICE.

ISIDORE BLOCH, OF PARIS, FRANCE.

HERMETIC FASTENING FOR PRESERVE OR OTHER TINS.

SPECIFICATION forming part of Letters Patent No. 601,787, dated April 5, 1898.

Application filed August 14, 1897. Serial No. 648,193. (No model.) Patented in France February 19, 1897, No. 264,242.

*To all whom it may concern:*

Be it known that I, ISIDORE BLOCH, manufacturer, of No. 6 Rue de Belzunce, Paris, in the Republic of France, have invented new Improvements in Hermetic Fastenings without Fittings for Preserve or other Similar Tins, (for which I have obtained Letters Patent of France, No. 264,242, dated February 19, 1897;) and I do hereby declare that the following is a full and exact description thereof, reference being made to the accompanying drawings.

The use of a rubber or some other plastic or elastic fitting heretofore considered as being necessary for forming the joint of preserve-tins gives rise to some expense, increases the workmanship by requiring special machines for putting the said fitting rapidly in place, and is, moreover, objectionable in the case of rubber and other plastic bodies in many ways which are inherent to the nature even of the said fitting, which becomes transformed or deteriorated under the action of heat, acids, or thick or volatile oils and no longer answers the purpose for which it was intended.

My invention relates to closing devices for tins, made exclusively of metal, and has for its object the construction of hermetic joints between such tins and their lids or covers in a simple, efficient, and inexpensive manner and without the interposition of additional appliances or substances. I accomplish this and other useful objects by providing on said parts suitable corresponding rims or flanges and by so deflecting and arranging the same with reference to each other and to the main body of the tin that the contents of the tin in order to escape between it and its cover would have to change direction repeatedly and would have to pass between surfaces of said parts closely adjoining each other. In doing so I provide on either or both of said rims or flanges one or more fillets or rabbets formed by corrugating, ferruling, repoussé-work, or in any other manner, and which during the closing operation are brought down firmly against the bent edge of the tin or cover, as the case may be.

I can obtain the hermetic fastening without any fitting either in providing one or more rabbets or fillets on the tin or its cover before the fastening operation, said rabbets or fillets being brought down against the smooth and lowered rim or flange of the other part during the fastening operation, or in shaping or producing said fillets or rabbets during the said fastening operation by means of a suitable special device in order to reduce the two operations into one when closing the tins.

Whatever the plan followed may be, all objections to plastic or elastic fittings are done away with in this new fastening, which evidently will always remain air-tight.

Figure 7:
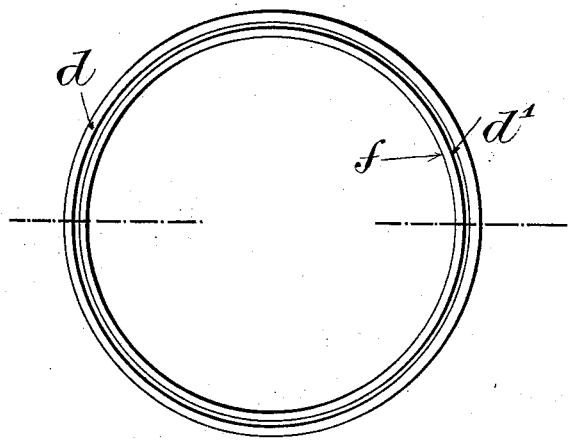
Figure 8:
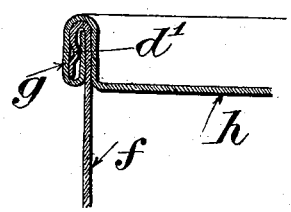
Figure 9:
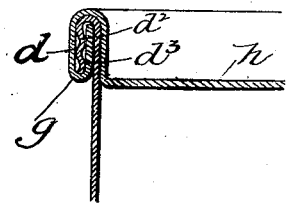

In the accompanying drawings, Figures 1 and 2 represent, respectively, a section and a plan view of the lid of a preserve-tin provided with a flange having a proper fillet for making the joint. Figs. 3 are 4 are part sections, on a larger scale, of the flanged lid before and after the fastening of the same on the tin. Fig. 5 represents a lid with lowered edges having a fillet for the joint all around. Figs. 6 to 8 relate to the case where fillets for the joint are provided on the tin itself, Fig. 6 being a part section of the tin having on its upper edge a flange for the joint, Fig. 7 a plan of Fig. 6, and Fig. 8 a section, on a larger scale, of the joint after the lid has been fastened on the tin. Fig. 9 is a part section of a tin corresponding with Fig. 8, several fillets being provided, however, on the flange of the tin itself.

Referring to Figs. 1 to 4, it will be seen that instead of keeping smooth or flat the edge of the lid $a$, which during the closing operation is to come and engage itself between the wall of the tin $b$ and its bent edge $b'$, I provide on the rim of the said lid one or more rabbets or fillets $c$ by corrugating, ferruling, or any other suitable means. The said fillets are either continuous or interrupted, straight, waved, or straggling. During the closing operation the said flange or flanges are fixed down tight against the turned-down edge of the tin, as is clearly shown in Fig. 4, and leave no space whatever for the passage of air or liquids.

In the case of fastenings with a lid having turned-down edges the fillet, instead of being provided on the upper face of the lid, will be on the vertical inner wall of its turned-down flange, as shown in Fig. 5. The fillet $c'$ is obtained in this case by repoussé work or by any other approved or well-known means.

In Figs. 6 to 8 it will be seen that instead of maintaining smooth the flange $d$ of the tin $f$, which during the closing operation is to become engaged between the twice-bent flange $g$ of the lid $h$, I provide on the flange $d$ one or more fillets $d'$, straight, waved, or straggled, made by ferruling or by any other means. During the closing operation the said fillet or fillets are brought down against the turned-down edge of the lid, as clearly shown in Fig. 8.

In Fig. 9 three fillets $d^2$, $d^3$, and $d^4$ are provided on the flange of the tin $f$, so as to properly coact with different portions of flange $g$ of the lid $h$.

As hereinbefore described, I may make the fillet or fillets during the closing operation by employing, for instance, some special device, one ridge of which will form the fillet while the closing down is being done behind.

In any case a perfect joint is obtained after the closing down, and it will be easily understood that as the said joint is proof against both destruction and physical or chemical action it offers great advantages over all joints provided with fittings.

While the use of a single fillet will generally suffice to secure a perfectly air-tight joint, I desire to have it understood that I do not propose to limit myself to the exact constructions shown or to the number of fillets to be used either on the cover or on the tin itself, it being clear that details of my constructions as illustrated herein may be varied without departing from the spirit of my invention.

I claim as new and desire to secure by Letters Patent—

1. The combination with a flanged tin, of a cover having a flange facing and adjoining the flange on the tin, one of said flanges being provided with a suitable fillet, the two flanges being deflected into positions parallel with and close to portions of the walls of the tin, substantially as set forth.

2. The combination with a flanged tin, of a cover having a flange facing the flange on the tin, one of said flanges being provided with a suitable fillet, the flange on one part overlapping and adjoining both sides of the flange on the other part, both flanges being deflected into positions parallel with and close to portions of the walls of the tin, substantially as set forth.

3. The combination with a flanged tin, of a cover having a flange facing and adjoining the flange on the tin, one of said flanges being provided with a suitable fillet, the two flanges deflected into positions close to outer surfaces of the walls of the tin, the cover being deflected inside of the tin, the portions so deflected being placed close to the interior surfaces of said tin, substantially as set forth.

4. The combination with a tin $b$ having a flange $b'$ turned downward, of a cover $a$ having a flange provided with a fillet $c$, such flange being deflected downward and upward along flange $b'$, substantially as set forth.

In witness whereof I have hereunto set my hand in presence of two witnesses.

ISIDORE BLOCH.

Witnesses:
GEO. LAURENT,
EUGÉNE A. WATTIER.